United States Patent [19]
Moran

[11] Patent Number: 5,647,784
[45] Date of Patent: Jul. 15, 1997

[54] COMPOSITE BODYBOARD WITH INCREASED STRENGTH AND BONDING CHARACTERISTICS

[75] Inventor: Steven M. Moran, Long Beach, Calif.

[73] Assignee: Mattel, Inc., El Segundo, Calif.

[21] Appl. No.: 597,409

[22] Filed: Feb. 8, 1996

[51] Int. Cl.⁶ .................................................. B63B 1/00
[52] U.S. Cl. ............................................ 441/65; 114/357
[58] Field of Search ..................... 441/65, 74; 114/355, 114/356, 357, 39.2; 428/71, 72, 73, 76, 116, 117, 118

[56] References Cited

U.S. PATENT DOCUMENTS

| | | |
|---|---|---|
| 3,514,798 | 6/1970 | Ellis . |
| 4,129,911 | 12/1978 | McDonald et al. . |
| 4,457,729 | 7/1984 | Peerlkamp . |
| 4,753,836 | 6/1988 | Mizell . |
| 4,797,312 | 1/1989 | Sherwood . |
| 4,850,913 | 7/1989 | Szabad, Jr. . |
| 4,857,380 | 8/1989 | Kent . |
| 5,114,370 | 5/1992 | Moran . |
| 5,211,593 | 5/1993 | Schneider et al. ............. 114/357 |
| 5,224,890 | 7/1993 | Moran . |
| 5,238,434 | 8/1993 | Moran . |
| 5,275,860 | 1/1994 | D'Luzansky et al. . |
| 5,295,883 | 3/1994 | Moran . |
| 5,350,544 | 9/1994 | Bambara et al. . |
| 5,489,228 | 2/1996 | Richardson et al. ............. 114/357 |

Primary Examiner—Stephen Avila
Attorney, Agent, or Firm—Kolisch, Hartwell, Dickinson, McCormack & Heuser

[57] ABSTRACT

An improved bodyboard includes a core, an outer covering enclosing the core, and, according to one aspect of the invention, a separation-resistant terpolymeric intermediate layer disposed between and adhesively bonding at least a portion of the core and covering. Preferably, the intermediate layer is a terpolymer based on polyethylene vinylacetate and in the form of a thin, slit-film bonding adhesive. According to another aspect of the invention, a bodyboard core is formed from a plurality of elongate cells joined together in a manner defining a honeycomb structure. Preferably, the cells are extrusions of a polypropylene material. Methods for forming the above are described as well.

43 Claims, 2 Drawing Sheets

COMPOSITE BODYBOARD WITH INCREASED STRENGTH AND BONDING CHARACTERISTICS

BACKGROUND AND SUMMARY

This invention relates generally to bodyboards, and more particularly it concerns a bodyboard with increased strength and bonding characteristics, and a method for forming the same.

Bodyboards are well known and several are disclosed in my U.S. Pat. Nos. 5,114,370, 5,224,890, and U.S. Pat. No. 5,238,434. The quest to make a better bodyboard confronts one with several problems which must be addressed and overcome. The board must be strong enough to withstand the stresses expected in the settings in which it is used. It must be light and maneuverable so that a rider may adequately cut through the water when riding the board. The shape of a board is important for it must function as a water foil and efficiently cut through the water.

On the topic of board strength, one should understand that most, if not all boards today have some type of composite construction. That is, most boards have a foam core with an outer skin surrounding the core to define the upper and lower surfaces of the board. The upper surface is usually referred to as the top deck. The top deck may have a textured surface to provide a frictional surface to hold a rider thereon during riding. The bottom surface is usually a slick, friction-reducing surface which enhances the board's ability to cut through the water. A typical core which has been found to be satisfactory is a so-called Ethafoam® synthetic foam product marketed by Dow Chemical Co. While cores formed from Ethafoam® have performed suitably well with respect to strength, weight, and flexibility characteristics, the push to find an even better core product leads us to one aspect of the present invention, i.e., an improved core construction.

Further on the topic of a board's strength, it will be appreciated that because most boards are formed from a composite material, there exists an inherent layering between the different elements comprising the composite. If one were to take a slice through a board, from the top surface to the bottom surface, one would see the different layers of a board, which typically include, as mentioned above, an outer skin defining the top and bottom surfaces, and an internal core of foam material. One problem associated with a composite material such as that described above, is the possibility of the composite coming apart. That is, anytime one layer is bonded onto another layer, there is a possibility that the layers, due to whatever circumstances, will become separated or unbonded from one another. Thus, the push to make a better bodyboard has focussed efforts on developing materials and methods for bonding the various layers of a board together in a manner which ensures that such will not become separated during the useful life of the product.

With the above problems in mind, it is a general object of the present invention to provide a bodyboard which is lightweight and strong enough to withstand the stresses expected in the operating environment.

It is another object to provide a bodyboard which is composite in construction and wherein the individual elements making up the composite are bonded together in a strong manner which resists separation.

It is yet another object of the invention to provide a bodyboard with an inner core of material which stronger and lighter than conventionally-available cores.

With the above objects in mind, the invention achieves these and other advantages in the form of a composite bodyboard with an improved, strength-enhancing construction. According to one feature of the invention, the bodyboard includes a core dimensioned to support a rider, an outer covering which is thin in relation to the core, generally enclosing the core, and a separation-resistant, terpolymeric intermediate layer disposed between and adhesively bonding together at least a portion of the core and covering.

According to another feature of the invention, an improved bodyboard with a fortified interior includes an elongate core extending along a generally straight central axis between a tail section and a nose section. The core is formed from a plurality of elongate cells joined together in a manner defining a honeycomb-like structure. Each of the cells are joined together such that each cell's long axis is generally parallel to the core's central axis which provides a core which resists deformation in directions both along and transverse the core's central axis. Upper and lower skins cover the core in a manner defining, respectively, the board's upper and lower surfaces.

According to yet another feature of the invention, an improved, fortified bodyboard with increased strength characteristics includes an elongate core extending along a generally straight central axis between a tail section and a nose section, the core being formed from a plurality of elongate, extruded polypropylene cells joined together in a manner defining a matrix. The cells are joined together such that each cell's long axis is generally parallel to the core's central axis and provide a core which resists deformation in directions both along and transverse the core's central axis. An outer covering which is thin in relation to the core, encloses the core, and a separation-resistant terpolymeric intermediate layer is disposed between and adhesively bonds together at least a portion of the core and covering.

These and additional objects and advantages of the present invention will be more readily understood after a consideration of the drawings and the detailed description of the preferred embodiment.

DETAILED DESCRIPTION OF THE PREFERRED EMBODIMENTS

Figure 1:
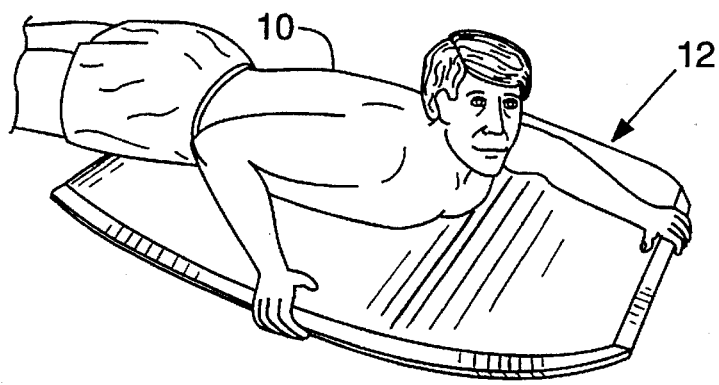
FIG. 1 is a perspective view of a bodyboard rider positioned on a bodyboard of the present invention.

Shown generally at 10 in FIG. 1 is a bodyboarder atop a bodyboard 12 constructed according to the preferred embodiments of the present invention. As will become apparent after the description below is read, bodyboard 12 provides a rider with a stronger, stiffer, more maneuverable board with a useful product life far superior to other boards which are currently available. This has been made possible by advances in the board core and bonding technologies discussed below.

For general background information on bodyboard formation, construction, composition and the like, the reader is referred to my U.S. Pat. Nos. 5,114,370, 5,224,890, 5,238,434, and U.S. Pat. No. 5,295,833 the disclosures of which are expressly incorporated herein by reference.

One aspect of my improved bodyboard construction focusses on the bonding of the various layers of a multi-layered, composite bodyboard so that the board has increased strength characteristics which include resisting so-called delamination or peeling. One such board is shown in exploded view in FIG. 2, and includes an elongate, planar core 14 dimensioned to support a rider thereon, and extending along a generally straight central axis 16 between a tail section 18 and a nose section 20. The core may be formed from any suitable material known for forming bodyboard cores, but is preferably a light-weight, rigidified polypropylene material characterized by a plurality of elongate, extruded, closed-cells which are bonded together to form a honeycomb structure described in more detail below. The core includes a top planar surface 22 and a bottom surface which is not specifically designated in FIG. 2, but will be understood to lie on the opposite side of core 14. Such a material suitable for forming the preferred core is marketed by Dow Chemical Co.

A polymeric outer covering includes an upper skin 24 and a lower skin 26. The skins are typically thin in relation to the core, and generally enclose the core in a known manner. Preferably, upper skin 24 is formed from a polymeric material, such as polyethylene with a density of around six pounds-per-cubic-foot. It will be appreciated, however, that any suitable material may be used for the upper skin. Lower skin 26 is preferably formed from a high-quality, friction-reducing covering such as Surlyn®, made by DuPont. Side rails 28, 30 and a foam tail 32 are shown and are conventional. An optional mesh reinforcement 34 is provided between core 14 and upper skin 24. It will be appreciated that the mesh reinforcement may be disposed between the core and the lower skin, or, that only portions of mesh reinforcement may be disposed between either or both of the upper and lower skins and core to provide a board with variable stiffness. Up to this point, what has been described above, with the exception of the preferred core material, is conventional. It will be understood that, up to now, great success has not been achieved when attempts have been made to bond different types of materials, such as polyethylene and polypropylene, or Surlyn® and polypropylene to form a bodyboard. That is, problems have been experienced when attempts have been made to bond bodyboard cores with upper or lower skins which are formed from different materials. Problems such as delamination stemming from bond integrity between bodyboard composite layers provide a continuing challenge to find a better bonding material so that a better, stronger bodyboard may be built. One source of the above-mentioned problem is that the temperatures required to bond certain materials, such as polyethylene and polypropylene together, are subject to precision such that if the desired temperature is not achieved and maintained for a suitable period of time, a satisfactory bond will not result.

A bonding material which addresses and solves the above-mentioned (and other) problems is shown at 36 in the form of an intermediate layer between: upper skin 24 and core 14, lower skin 26 and core 14, side rails 28, 30 and core 14, and tail 32 and core 14. The intermediate layer is disposed between and adhesively bonded (when the board is assembled as described below) with the core and covering, i.e., the upper and lower skins, rails, and tail to form an integral connection therebetween. It will be understood that the term "intermediate", as that term is used in connection with the intermediate layer described below which is used to adhesively bond the core with the outer covering, is not intended to exclude the presence of other materials or layers of materials which might be considered as "intermediate" in the sense that such may be, or are located between the core and the outer covering. Preferably, the intermediate layer 36 covers the entire core 14, i.e., top, bottom, sides, and tail so that when the core and covering are bonded together, one integral composite board is formed. It will be understood, however, that the intermediate layer may be disposed only between one of the bodyboard's skins and the respective top or bottom core surface.

The preferred intermediate layer is an adhesive-bonding, thin-film (e.g., about 2-mils) formed from a terpolymer material which forms a very strong adhesive bond with, and between the core and covering. The preferred terpolymer material is on based on polyethylene vinylacetate or a so-called modified polyethylene vinylacetate, and is most preferably in the form of a so-called adhesive slit film which is heat-shrinkable and heat bondable. Such a bonding film is sold under the trade name XIRO® by a company called Dry Adhesive Technologies in Akron, Ohio. Of the terpolymer slit films available, two have been found to provide superior bonding characteristics. These films are distinguishable based on each's melting point, which naturally, affects the heat processing procedure during board formation. The preferred film has a melting point or heat processing temperature of around between 87- to 92-degrees Celsius and is designated by Dry Adhesives Technologies as Reference No. 2061, while the alternate film has a melting point or heat processing temperature of around between 83- to 87-degrees Celsius and is designated as Reference No. 2081. The former is the most preferred because the higher melting temperature forms a better adhesive between the bodyboard layers.

Figure 4:
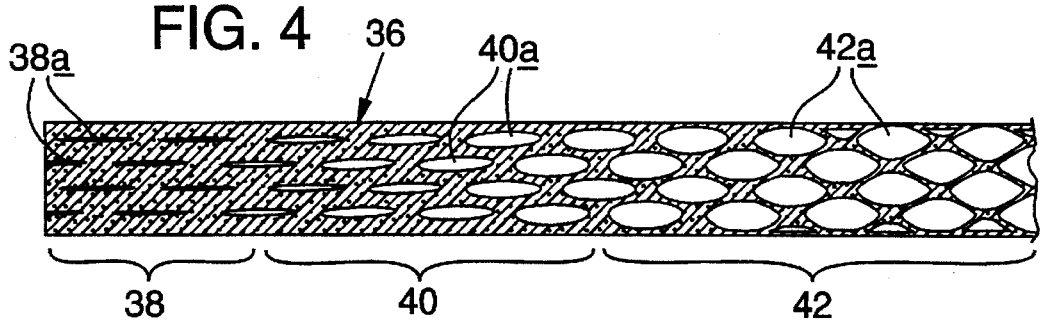
FIG. 4 is a top plan view of a section of material comprising the intermediate layer.

FIG. 4 shows a portion of intermediate layer 36 where the bonding film may be seen to include three regions 38, 40, 42. Region 38 depicts the film in its configuration before heat treatment or processing where a plurality of relatively short, e.g., 3/16-inch, slits 38a are disposed therein. Regions 40, 42 show, respectively, a transition region, and a post-treatment region. During heat treatment, i.e., thermolamination, the film material between the slits shrinks so that the slits expand, first to the cigar shapes 40a shown in the transition region, then, with continued application of heat, to the football-shaped net-like structures 42a of region 42. One of the principal advantages of the bonding film mentioned above is that materials of different types may be bonded together in strong, separation-resistant bonds which heretofore were difficult to achieve. The resulting product is a stronger, longer lasting board which prevents delamination. The bonding film, and more particularly the slits therein may be oriented in any direction relative to the core's central axis 16, e.g., parallel, perpendicular, or oblique.

Another aspect of my invention focusses on the core of the bodyboard and is directed to providing a stratified, deformation-resistant core which is much stronger than cores which are presently available. To this extent, FIG. 3 shows a slice of the bodyboard which illustrates the board's composite structure and core in more detail, and FIG. 3A shows a plan view of a portion of so-called honeycomb structure described in more detail below.

Figure 2:
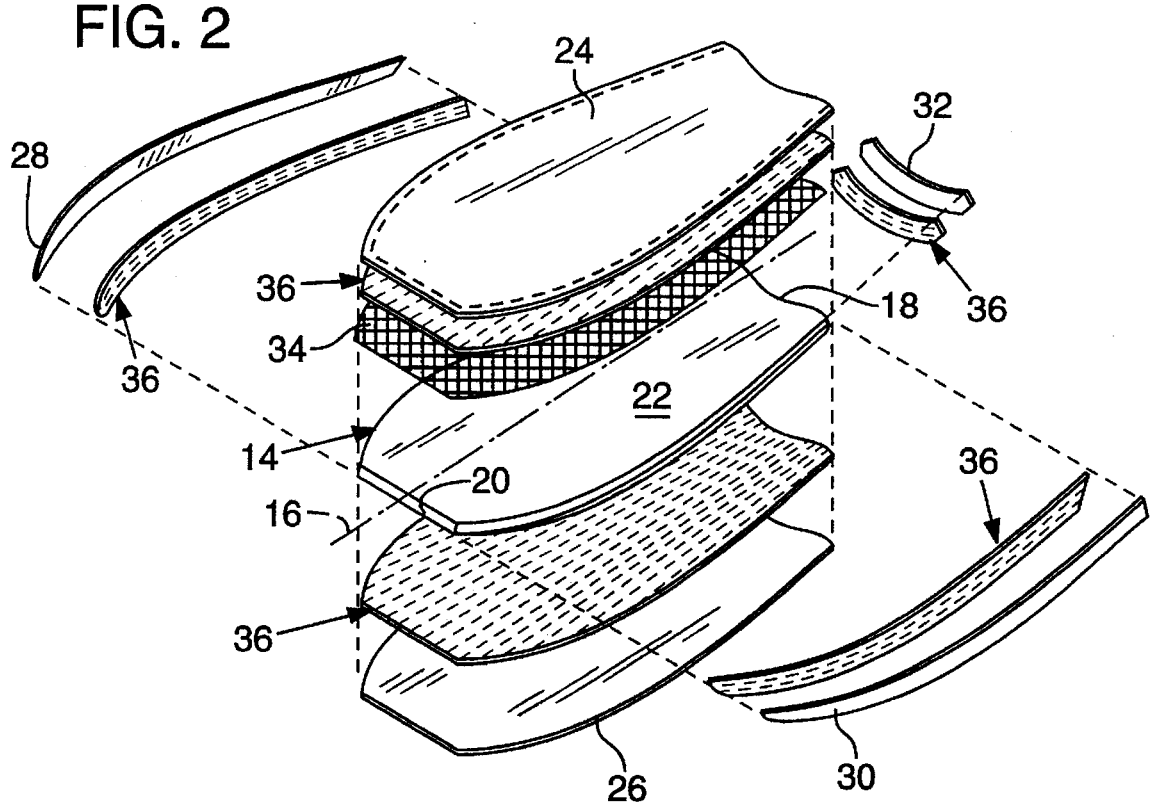
FIG. 2 is an exploded perspective view of the parts of an assembled bodyboard illustrating the various layers and elements in the construction of the bodyboard.

Describing first the preferred core, the reader will see that the core is formed from a plurality of elongate cells, representative ones of which are indicated at 44. The cells are joined together, as by heat-bonding, in a manner which defines a honeycomb or honeycomb-like structure. Preferably the honeycomb structure is formed into the board's core such that each cell's long axis, a representative one of which is shown at 44a, is generally parallel to the core's central axis 16 (FIG. 2). In this way, the aggregate of cells provides a core which resists deformation in directions both along and transverse the core's central axis. A preferred material for forming the extruded cells is polypropylene which has been found to possess sufficient strength characteristics to provide the requisite resistance to deformation. The cells, in aggregate, define a matrix which might be likened, in a sense, to a handful or bundle of straws. Taken separately, each straw is somewhat bendable and deformable, as indicated by the single cell which has been peeled away in FIG. 3. But, taken together, the straws form a structure which is generally rigidified and resists bending in any one direction.

As mentioned above, the honeycomb is formed from a plurality of cells which are preferably extrusions of a polypropylene material. The cells are heat-bonded or heat fused to form the matrix or honeycomb. Such structure provides a strong inner core which is both lightweight, i.e., around 1.7 pounds-per-cubic-foot, and durable enough to withstand the stresses expected in the operating environment. The cells should have a polygonal, and preferably a hexagonal transverse cross-section as shown best in FIG. 3A, although, it will be understood that other suitable cell cross-sections such as circular and the like will suffice. The hexagonal cross-sectional shape, however, has been found preferable because of the increased strength provided to the core. This increased strength is derived, in part, from the behavior of the cells when the same are aggregated by heat-bonding to form the honeycomb core. Preferably, as shown in FIG. 3A, each cell includes a plurality of sides 46 which extend longitudinally along the bodyboard forming, in cross-section, a closed cell. Each side of each cell is preferably joined to a side of an adjacent cell (except possibly for boundary cells, i.e., cells about the periphery of the matrix). Thus, any one hexagonally-cross-sectioned cell, excluding boundary cells, would have six neighbors bonded thereto. Similarly, any rectangularly-cross-sectioned cell, excluding boundary cells, would have four neighbors. The same applies for any other polygonally-cross-sectioned cell such as triangular and the like. It will be appreciated that cells which start out as circular in cross-section, when heat-bonded together to form the above-described matrix, would, necessarily assume a polygonal or polygonal-like cross-section.

Figure 3:
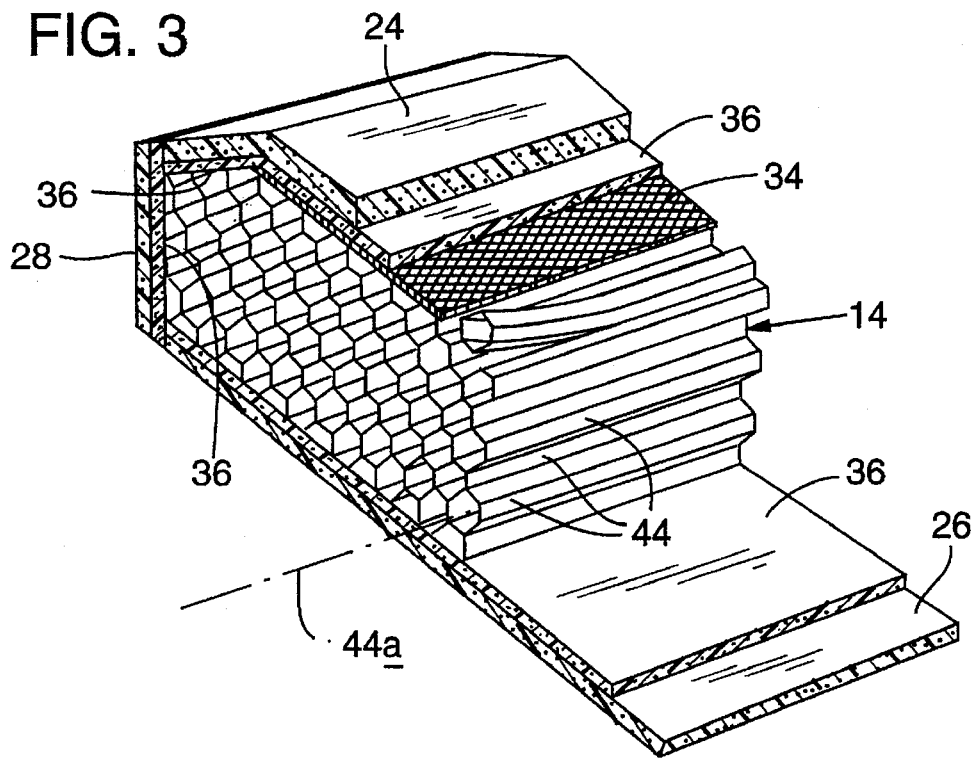
FIG. 3 is a perspective view of a slice of the bodyboard illustrating the layered construction of the bodyboard, the bodyboard's core structure, and the location of the intermediate layers.
Figure 3A:
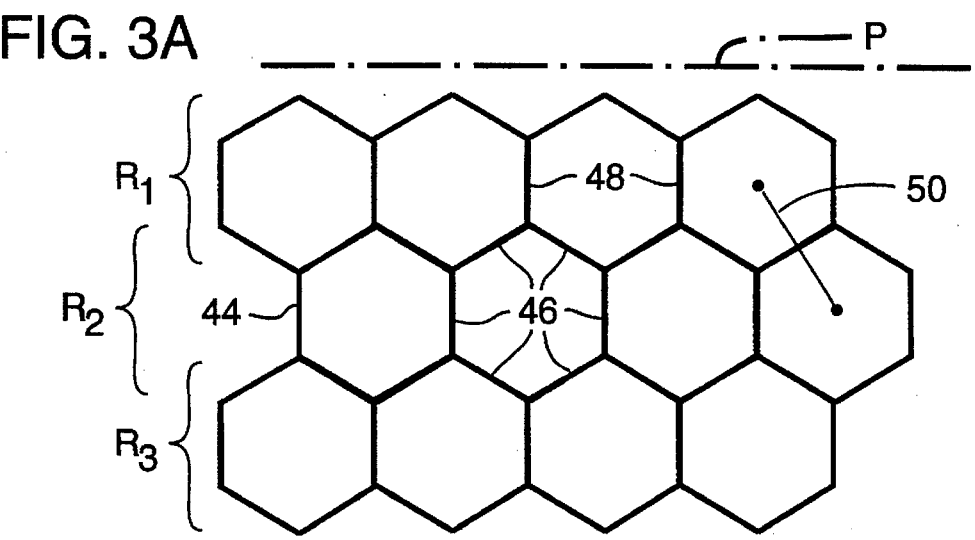
FIG. 3A is a plan view of a portion of the core structure of FIG. 3.

In the hex-shaped cells depicted in FIGS. 3 and 3A, the reader will notice that the cells are arranged in plural rows, representational ones of which are shown in FIG. 3A at $R_1$, $R_2$, $R_3$. The rows are stacked atop one another and may extend generally horizontally across the width of the bodyboard. The majority of the cells in any one row are joined to two other cells in the same row, one on either side. One exception to this orientation occurs at the boundary cells where, necessarily, one neighbor cell is missing. Further, in the orientation shown in FIG. 3A, each cell is joined to at least one other cell along a side which is generally perpendicular to plane P of the board. Representative sides are indicated at 48. This particular layout resists deformation along the board's central axis (as if one were to attempt to bend the board between the nose and tail). Additionally, adjacent rows such as $R_1$ and $R_2$ are offset from one another such that a line 50 connecting the centers of any two adjacent cells in adjacent rows defines a line which is oblique relative to the plane P of the bodyboard. It will be appreciated that the above-description, e.g., offset rows of closed, hexagonally-shaped cells, is a description of the preferred core structure only, and is not meant to limit the invention in any way. To that end, other cell constructions may be utilized in forming the deformation-resistant matrix and need not have the above-described offset orientation or cross-sectional shape.

With this in mind, construction of the preferred embodiment of the invention will now be described, the preferred embodiment being one which includes a core as described above, and two intermediate layers 36 of bonding film, one each between the core 14 and the upper and lower skins 24, 26 respectively. Additionally, the preferred bodyboard includes an intermediate layer between the core and each of side rails and tail.

The description below is given with the assumption that the reader is familiar, at least generally, with bodyboards and construction techniques for forming the same. For those who are not familiar with such construction, reference should be made to my above-referenced patents. With that, and referring now to the construction of a preferred bodyboard, first, a terpolymeric bonding film, as described above, is heat-laminated or thermolaminated on the outer skin. The skin may, but need not be polyethylene. Bonding film is heat-laminated to each of the outer skins, including the side rails and tail. The relative position of the bonding film (intermediate layer) is shown in FIG. 3 at 36. The specific structure of the bonding film, according to the preferred embodiment, is set forth in FIG. 4 and discussed above. It will be appreciated that the depiction of the bonding film in FIG. 3 is intended to show only its relative position with respect to the other layered elements. An advantage of the XIRO® bonding film is that when thermolamination occurs, the film melts and acts as a glue. Such melting takes place at a temperature below the melting point of polyethylene (in the event that polyethylene is chosen as the skin, rails, and tail). Once the film is applied, the combination of skin and terpolymeric bonding film are thermolaminated on core 14. Mesh reinforcing layer 34 may be, and preferably is interposed between the core and the bonding film on the upper side of the board adding a degree of rigidity. With the upper and lower skins in place, the side rails and tail (and associated intermediate layers) may be applied and the remainder of the board formed, as by thermolamination procedures described in my above-references patents. It will be appreciated that the bonding film may first be thermolaminated to the core, and then to the respective skins, or, that the entire composite may be formed at one time. What is important with respect to the bonding film, is that a superior bond is capable of being formed between at least one of the bodyboard's outer skins, and the board's core, and, that such material, e.g., skin and core, need not be the same or similar. More generally, the above-described bonding film is useful for imparting a superior bond between many different types of polymeric materials which might be used for constructing bodyboards and is not limited to materials which are the same or similar. The illustrative example of bonding a polyethylene outer covering to an interior core of polypropylene is not meant to limit the invention in any way.

Another of the advantages of the above-described terpolymeric bonding films, and the particular netting structure afforded by thereby is that once the film joins the core and the outer skin, the film resists, and in fact, prevents any air bubbles from working into the area between the core and skin and degrading the integrity of the bond therebetween. Further, the netting structure also allows air to escape through the open area which is desirable during board formation. The film also more efficiently adheres to the core and skin surfaces, and particularly those surfaces which are naturally rough, by getting into the nooks and crannies so-to-speak.

One of the conventionally-accepted ways to measure or gauge the strength of a bond between two materials is a so-called "peel test" in which fully-treated or bonded materials are forcibly separated. If the materials are not strongly bonded, then such will usually, when subjected to the peel test, separate cleanly along the joinder region between them. However, if materials are strongly bonded together, then when forcibly separated remnant portions of one material will usually cling to or coat to other material. When a bodyboard is formed as described above, a forced separation between the outer skin and the board core will result in remnant portions of board core clinging to the underside of the outer skin and intermediate layer. That is, the above-described composite bodyboard passes the peel test thereby evidencing a superior bond.

Briefly summarizing, a superior bodyboard and method for constructing the same have been described. According to one feature of the invention, an improved bonding material is utilized for at least one of the board's intermediate layers. The improved bonding material, preferably a thin, heat-bondable film, allows different types of material to be bonded together. This is advantageous because much stronger boards may be made from conventionally-available materials. Additionally, the bonding film is excellent for blanketing and forming an adhesive connection between rough-surfaced materials. According to another feature of the invention, an improved bodyboard core is provided which includes a plurality of closed-cell, elongate strands or cells, each of which have a polygonal transverse cross-section, which, according to the preferred embodiment is in the form of a hexagon. The improved core is lighter and stronger than conventionally-available foam cores. When both of the above aspects are combined to form one board, the resulting board has a stronger, more durable construction which is both lightweight and maneuverable.

While the present invention has been shown and described with reference to the foregoing preferred embodiment, it is to be understood by those skilled in the art that other changes in form and detail may be made therein without departing from the spirit and scope of the invention as defined in the appended claims.

I claim:

1. An improved, multi-layered, composite, bodyboard with increased strength characteristics comprising:
   a core dimensioned to support a rider;
   an outer covering which is thin in relation to the core, generally enclosing the core; and
   a separation-resistant terpolymeric intermediate layer disposed between and adhesively bonding together at least a portion of the core and covering.

2. The bodyboard of claim 1, wherein the core defines an elongate, generally planar board with a top surface and a bottom surface, and the intermediate layer is disposed between the top surface and the outer covering.

3. The bodyboard of claim 1, wherein the core defines an elongate, generally planar board with a top surface and a bottom surface, and the intermediate layer is disposed between the bottom surface and the outer covering.

4. The bodyboard of claim 1, wherein the core defines an elongate, generally planar board and the intermediate layer substantially covers the entire core.

5. The bodyboard of claim 1, wherein the intermediate layer is based on polyethylene vinylacetate.

6. The bodyboard of claim 1, wherein the intermediate layer is heat-bonded with the core and covering.

7. The bodyboard of claim 6, wherein the intermediate layer has a heat-processing temperature to effect bonding of around about 87- to 92-degrees Celsius.

8. The bodyboard of claim 6, wherein the intermediate layer has a heat-processing temperature to effect bonding of around about 83°- to 87-degrees Celsius.

9. The bodyboard of claim 5, wherein the intermediate layer is formed from an adhesive bonding film which is heat-processable for forming the above-mentioned bond.

10. The bodyboard of claim 9, wherein the film includes a plurality of slits which, when subjected to heat-processing, expand to define a net-like bonding layer.

11. An improved bodyboard with a fortified interior comprising:
    an elongate core extending along a generally straight central axis between a tail section and a nose section, wherein the core is formed from a plurality of elongate cells joined together in a manner defining a honeycomb-like structure, and wherein the cells are joined together such that each cell's long axis is generally parallel to the core's central axis, thereby providing a core which resists deformation in directions both along and transverse the core's central axis;
    an upper skin covering the core in a manner defining the board's upper surface; and
    a lower skin covering the core in a manner defining the board's lower surface.

12. The bodyboard of claim 11, wherein each of the cells has a polygonal transverse cross-section.

13. The bodyboard of claim 12, wherein a majority of the polygons are hexagons.

14. The bodyboard of claim 12, wherein each cell includes a plurality of sides and at least one such side is joined to the side of an adjacent cell.

15. The bodyboard of claim 14, wherein the cells are arranged in plural rows stacked one atop the other, wherein at least a majority of the cells are joined to an adjacent cell along a side which is generally perpendicular to the plane of the board.

16. The bodyboard of claim 15, wherein adjacent rows are offset relative to one another such that a line connecting the centers of any two adjacent cells in adjacent rows defines a line which is oblique relative to the plane of the board.

17. The bodyboard of claim 11, wherein each cell is an extrusion of polypropylene material.

18. The bodyboard of claim 12, wherein each cell is an extrusion of polypropylene material.

19. The bodyboard of claim 11, wherein the cells are heat-bonded together to form the core.

20. An improved, fortified bodyboard with increased strength characteristics comprising:
    an elongate core extending along a generally straight central axis between a tail section and a nose section, wherein the core is formed from a plurality of elongate, extruded polypropylene cells joined together in a manner defining a matrix, and wherein the cells are joined together such that each cell's long axis is generally parallel to the core's central axis, thereby providing a core which resists deformation in directions both along and transverse the core's central axis;
    an outer covering which is thin in relation to the core, generally enclosing the core; and
    a separation-resistant terpolymeric intermediate layer disposed between and adhesively bonding together at least a portion of the core and covering.

21. The bodyboard of claim 20, wherein the intermediate layer is a terpolymer based on polyethylene vinylacetate.

22. The bodyboard of claim 21, wherein the intermediate layer has a heat-processing temperature to effect bonding of between about 87- to 92-degrees Celsius.

23. The bodyboard of claim 21, wherein the intermediate layer has a heat-processing temperature to effect bonding of between about 83- to 87-degrees Celsius.

24. The bodyboard of claim 21, wherein the intermediate layer is formed from a heat-shrinkable, heat-bondable film.

25. The bodyboard of claim 20, wherein each of the cells has a polygonal transverse cross-section.

26. The bodyboard of claim 25, wherein a majority of the polygons are hexagons.

27. The bodyboard of claim 20, wherein the cells are arranged in plural rows extending generally horizontally across the width of the board, the rows being stacked one atop the other, wherein at least a majority of the cells in any one row are joined to two other cells in the same row, one on either side.

28. The bodyboard of claim 27, wherein such joined, same-row cells are joined along sides which are generally perpendicular to the plane of the bodyboard.

29. The bodyboard of claim 28, wherein adjacent rows are offset relative to one another such that a line connecting the centers of any two adjacent cells in adjacent rows defines a line which is oblique relative to the plane of the bodyboard.

30. A method of forming an improved, multi-layered, composite bodyboard with increased strength characteristics comprising the steps of:

forming an elongate, planar bodyboard core having a top and bottom surface;

forming a thin outer covering for the bodyboard;

disposing a terpolymeric intermediate layer between at least a portion of the core and covering; and adhesively bonding the intermediate layer to the core and covering so that a separation-resistant bond is formed therebetween.

31. The method of claim 30, wherein the disposing step includes disposing the intermediate layer between the core's top surface and outer covering.

32. The method of claim 30, wherein the disposing step includes disposing the intermediate layer between the core's bottom surface and outer covering.

33. The method of claim 30, wherein the disposing step includes disposing the intermediate layer substantially over the entire core.

34. The method of claim 30, wherein the intermediate layer is a terpolymer based on polyethylene vinylacetate.

35. The method of claim 34, wherein the step of adhesively bonding includes heat-processing the intermediate layer at a temperature of around about 87- to 92-degrees Celsius.

36. The method of claim 34, wherein the step of adhesively bonding includes heat-processing the intermediate layer at a temperature of around about 83- to 87-degrees Celsius.

37. The method of claim 34, wherein the intermediate layer is formed from an adhesive bonding film which is heat-processable for forming the above-mentioned bond.

38. A method of forming an improved, deformation-resistant bodyboard comprising the steps of:

providing a plurality of elongate, strand-like cells which have been joined together to form a matrix;

forming the matrix into a bodyboard core which extends along a generally straight central axis between a tail section and a nose section, wherein the cells are joined together and formed into the core in a manner such that most, if not all of the cells' long axes are generally parallel to the core's central axis; and covering the core with an outer skin.

39. The method of claim 38, wherein the cells are extrusions of a polypropylene material.

40. The method of claim 39, wherein each of the cells has a polygonal transverse cross-section.

41. The method of claim 39, further comprising the steps of disposing a terpolymeric intermediate layer between at least a portion of the core and skin, and adhesively bonding the intermediate layer to the core and skin so that a separation-resistant bond is formed therebetween.

42. The method of claim 41, wherein the intermediate layer is a terpolymer based on polyethylene vinylacetate.

43. The method of claim 38, wherein the cells have been joined together by heat-bonding.

* * * * *